United States Patent

Nordblom et al.

[15] 3,639,176

[45] Feb. 1, 1972

[54] ZINC ELECTRODE CONTAINING AN ADDITIVE TO REDUCE GASSING AT THE ZINC ELECTRODE IN A HEAT STERILIZED SILVER-ZINC ALKALINE BATTERY

[72] Inventors: George F. Nordblom, Yardley; Herbert I. James, Levittown, both of Pa.

[73] Assignee: ESB Incorporated

[22] Filed: Sept. 4, 1968

[21] Appl. No.: 758,652

[52] U.S. Cl. ................................................. 136/30, 136/28
[51] Int. Cl. ......................................................... H01m 39/00
[58] Field of Search .............. 136/26, 27, 28, 30, 125, 125.1; 75/201, 86

[56] References Cited

UNITED STATES PATENTS

| Re.25,608 | 6/1964 | Cahan | 136/26 |
|---|---|---|---|
| 2,983,777 | 5/1961 | Yardney | 136/30 X |
| 3,069,486 | 12/1962 | Solomon et al. | 136/125 X |
| 3,017,448 | 1/1962 | Cahan | 136/26 |
| 3,080,440 | 3/1963 | Ruetschi et al. | 136/26 X |
| 3,170,816 | 2/1965 | Voss et al. | 136/26 X |
| 3,335,031 | 8/1967 | Kordesch | 136/125 X |
| 3,335,032 | 8/1967 | Barnes | 136/26 X |
| 3,427,203 | 2/1969 | Fletcher | 136/125 X |
| 3,502,505 | 4/1970 | Jackson | 136/27 |

*Primary Examiner*—Benjamin R. Padgett
*Assistant Examiner*—Gary G. Solyst
*Attorney*—Alfred J. Snyder, Jr. and Robert H. Robinson

[57] ABSTRACT

A zinc electrode containing a mercuric sulfide additive to reduce gassing at the zinc electrode which is used as the negative electrode in a heat sterilized silver-zinc alkaline battery. The mercuric sulfide effectively reduces gassing at the zinc electrode without adversely affecting the capacity of the heat sterilized battery, whereas the conventional mercuric oxide additive reduces the capacity of the heat sterilized battery. The mercuric sulfide additive may be used in combination with a lead sulfide additive.

7 Claims, No Drawings

ZINC ELECTRODE CONTAINING AN ADDITIVE TO REDUCE GASSING AT THE ZINC ELECTRODE IN A HEAT STERILIZED SILVER-ZINC ALKALINE BATTERY

BACKGROUND OF THE INVENTION

Zinc is a widely used anode material despite its tendency to self-discharge on standing, particularly in alkaline electrolyte. Even though zinc has a high hydrogen overvoltage which should make it difficult for the hydrogen ions to accept electrons from the zinc electrode, a substantial quantity of hydrogen is evolved at the zinc electrode during wet storage or stand. In order to substantially reduce the hydrogen evolution, mercury which has a higher hydrogen overvoltage than zinc is generally incorporated into the zinc electrode to raise the hydrogen overvoltage. It is conventional to add mercuric oxide (HgO) to zinc active material, usually uncharged zinc oxide, to reduce gassing. It is particularly important in sealed batteries to reduce gas evolution to amounts low enough to prevent excessive pressure buildup.

In the space exploration program, the United States has jointly agreed with Russia not to contaminate the planets on which landings are attempted with living cells from Earth. As a result, the instruments to be landed on the planets including the capsule and the power source for said instruments must be sterilized prior to the attempted landing.

Silver-zinc batteries are often used as power sources for the instruments used during planet explorations, and therefore, it became necessary to develop a silver-zinc battery capable of being heat sterilized. It has been found that heat sterilization of conventional silver-zinc batteries causes a severe reduction in the capacity. During the investigation to determine the cause of the reduction in capacity, it was discovered that mercuric oxide caused the loss in capacity, for the heat sterilization caused the mercuric oxide to become more soluble in the alkaline electrolyte and the mercury contaminated the silver electrode, reducing the amount of silver converted to silver oxide during the charging of the battery. As a result, it became necessary to find a substitute for the mercuric oxide additive which could reduce the gassing of the zinc electrode and withstand the heat sterilization without adversely affecting the battery performance.

SUMMARY OF THE INVENTION

It is the general purpose of this invention to provide a zinc electrode containing an additive to reduce gassing which is capable of being heat sterilized. It has been discovered that mercuric sulfide (HgS) can be substituted for the mercuric oxide (HgO) in zinc electrodes to provide substantially equivalent reduction in gassing, and silver-zinc batteries having zinc anodes containing HgS can be heat sterilized without adversely affecting the battery capacity. It has been found that in a heat sterilized silver-zinc battery, HgS is effective in reducing gassing at the zinc electrode and does not adversely affect battery capacity such as the conventional HgO which dissolves in the hot alkaline electrolyte and contaminates the silver electrode.

A mixture of HgS and lead sulfide (PbS) is also an effective additive in zinc electrodes to reduce gassing, and this combination additive does not adversely affect the capacity of heat sterilized silver-zinc batteries. A mixture of HgS and PbS provides adequate gassing protection, reduces the possibility of short circuits caused by high concentrations of lead additives, and it reduces the amount of the more expensive HgS.

DESCRIPTION OF THE PREFERRED EMBODIMENT

In accordance with this invention, HgS and combinations of HgS with PbS are added to zinc electrodes to reduce the gassing (i.e., hydrogen evolution) of the zinc electrode and to enable the zinc electrode to be used in a battery which is to be heat sterilized without adversely affecting battery capacity. It is well known in the battery art that zinc electrodes which are to be used in alkaline electrolyte must contain an additive, usually mercuric oxide, to increase the hydrogen overvoltage of the electrode and thereby reduce the evolution of hydrogen at the zinc electrode. Since heat sterilized batteries employing zinc electrodes containing mercuric oxide had reduced capacity caused by mercury contamination of the positive (silver) electrode, it became necessary to find a substitute for the mercuric oxide. It has been found that HgS alone and in combination with PbS effectively reduces the hydrogen evolution at the zinc electrode without adversely affecting the capacity of heat sterilized silver-zinc alkaline batteries.

It has been found that heat sterilization adversely affects the capacity of charged silver-zinc alkaline batteries, and therefore, these batteries are heat sterilized in the discharged state and subsequently electrochemically charged to silver oxide-zinc metal. The discharged state of the zinc active material is zinc oxide, and the zinc electrodes of this invention are generally prepared by mixing the HgS additive with ZnO powder and then compressing the mixture onto a silver grid to form a pressed powder electrode. The HgS additive generally comprises from about 1 to about 10 percent by weight of the zinc oxide-additive mixture with from about 4 to about 7 percent by weight being particularly preferred. When using the combination HgS/PbS additive, the HgS may range from about 1 to about 5 percent by weight of the zinc oxide-additive mixture, and the PbS may also range from about 1 to about 5 percent by weight. The amount of the additive is not highly critical so long as there is a sufficient amount to suppress gassing, though excessive amounts of the HgS and PbS may adversely affect battery performance such as by formation of short circuits or interference with the charging of the silver electrode.

It is believed that in order to sufficiently sterilize the silver-zinc alkaline batteries, they should be heated to at least about 100° C. Early government specifications required that the batteries be tested at temperatures of 125° C., 135° C. and 145° C. Batteries using zinc electrodes in accordance with this invention are capable of being sterilized at a temperature of about 145° C., and possibly higher temperatures, without adversely affecting battery performance.

Inspection of heat sterilized silver-zinc alkaline batteries employing HgS in the zinc electrode which had been charged and discharged for several cycles revealed several interesting effects. The zinc electrode appeared to have better structure after prolonged cycling, less change of shape and reduced loss of active material from the grid than zinc electrodes having no HgS. It is believed that the HgS improves the cycle life and rechargeability of zinc electrodes. Some of the sulfur from the HgS additive may be entrapped in the separator where it can sequester silver ions by forming silver sulfide, and this helps to prevent short circuiting caused by migrating silver ions.

Another feature of alkaline batteries having zinc electrodes in accordance with this invention is the possible improved uncharged stand life at ordinary temperatures. Zinc electrodes having HgS instead of HgO may be particularly useful in batteries for use in hot climates, because of the relative insolubility of the HgS in alkaline electrolyte.

The following examples demonstrate the advantages achieved by using zinc electrodes containing HgS or HgS in combination with PbS instead of the conventional HgO additive.

EXAMPLE I

Several pressed powder zinc electrodes were prepared with various additives and studied for their effect on gassing characteristics in alkaline electrolyte. The electrodes were prepared by mixing the indicated percentage by weight of each additive with zinc oxide powder and the mixture was pressed onto a silver wire grid using a pressure of about 5,000 p.s.i. The electrodes were electrochemically charged to metallic zinc in alkaline electrolyte. Half sized strips of the various electrodes, in the charged condition, were placed in inverted burets containing alkaline electrolyte (40 percent KOH solution with 7.5 percent ZnO) and the volume of gas produced in 30 days was measured. The following results were recorded:

| Additive | ml. gas/30 days |
|---|---|
| None | 103 |
| 7% HgO | 1.0 |
| 7% HgS | 2.0 |
| 4% HgS | 4.0 |
| 3% HgS 2% PbS | 4.4 |

These results clearly indicate that the zinc electrode must contain an additive to reduce gassing and that the HgS and HgS/PbS additives are substantially equivalent to the HgO in reducing gassing.

EXAMPLE II

Several silver-zinc alkaline batteries were heat sterilized and then tested to determine the effect of the heat sterilization upon the capacity of the batteries. The single variable in these batteries was the zinc electrode which contained the additives which were tested in Example I for their effect on gassing. The zinc electrodes were prepared as in Example I and the positive electrodes were conventional silver oxide plates. The batteries contained a 40 percent KOH electrolyte solution and the separator comprised 4 layers of an irradiation produced graft copolymer of polyethylene and acrylic acid cross-linked by divinyl benzene (RAI 116) wrapped around the silver positive electrodes.

The silver-zinc alkaline batteries were heat sterilized in the uncharged condition at 145° C. for 112 hours. Thereafter, the batteries were cycled in open cells through a three-cycle regime in which they were charged at 35 milliamperes for 91.4 hours and discharged at 600 milliamperes until the positive voltage vs. a Hg/HgO reference electrode was −0.100 volts.

The following results were recorded:

| Zn electrode Additive | Capacity (a.-hr.) | | |
|---|---|---|---|
| | Cycle 1 | Cycle 2 | Cycle 3 |
| None | 2.40 | 2.05 | 1.99 |
| 2% HgO | 1.36 | 1.51 | 1.38 |
| 4% HgO | 1.22 | 0.94 | 1.21 |
| 7% HgO | 1.28 | 1.01 | 0.30 |
| 7% HgS | 2.40 | 2.20 | 2.30 |
| 3% HgS 2% PbS | 2.60 | 2.30 | 2.50 |
| 2% PbS | 2.60 | 2.30 | 2.50 |

These results clearly demonstrate that the HgO present in the zinc electrode adversely affected the capacity of the heat sterilized silver-zinc battery, whereas the HgS additive, alone and in combination with PbS, did not reduce the capacity of the heat sterilized battery.

Having completely described this invention, what is claimed is:

1. An uncharged zinc electrode comprising zinc active material and mercuric sulfide additive to reduce gassing at the zinc electrode, said mercuric sulfide being present in amounts ranging from about 1 to about 10 percent by weight of the zinc active material-additive mixture.

2. A zinc electrode in accordance with claim 1 in which the mercuric sulfide ranges from about 4 to about 7 percent by weight.

3. A zinc electrode in accordance with claim 1 in which the mercuric sulfide ranges from about 1 to about 5 percent and the electrode also contains from about 1 to about 5 percent of lead sulfide.

4. A silver-zinc alkaline battery which in the uncharged state comprises a silver positive electrode, a zinc negative electrode, an alkaline electrolyte and a separator between said positive and negative electrodes, said uncharged zinc negative electrode containing from about 1 to about 10 percent by weight of a mercuric sulfide additive.

5. A battery in accordance with claim 4 in which said uncharged zinc negative electrode contains from about 1 to about 5 percent by weight of mercuric sulfide and also contains from about 1 to about 5 percent by weight of lead sulfide.

6. A heat sterilized silver-zinc battery which in the uncharged state comprises a silver positive electrode, a zinc negative electrode, an alkaline electrolyte and a separator between said positive and negative electrodes, said uncharged zinc electrode containing from about 1 to about 10 percent by weight of mercuric sulfide, and said battery having been subjected to a temperature of at least about 100° C. to sterilize the components prior to charging the electrodes.

7. A battery in accordance with claim 6 in which the uncharged zinc electrode contains from about 1 to about 5 percent by weight of mercuric sulfide and from about 1 to about 5 percent by weight of lead sulfide.

* * * * *